United States Patent
Chung et al.

(10) Patent No.: US 11,095,797 B2
(45) Date of Patent: Aug. 17, 2021

(54) CHARACTERISTICS BASED OPERATION OF IMAGE FORMING APPARATUS

(71) Applicant: Hewlett-Packard Development Company, L.P., Spring, TX (US)

(72) Inventors: Woojun Chung, Seongnam-si (KR); Hyunsoo Oh, Seongnam-si (KR); Kyeongman Kim, Seongnam-si (KR); Seongwook Han, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/632,703

(22) PCT Filed: May 31, 2018

(86) PCT No.: PCT/KR2018/006232
§ 371 (c)(1),
(2) Date: Jan. 21, 2020

(87) PCT Pub. No.: WO2019/022363
PCT Pub. Date: Jan. 31, 2019

(65) Prior Publication Data
US 2020/0145557 A1    May 7, 2020

(30) Foreign Application Priority Data

Jul. 24, 2017  (KR) .......................... 10-2017-0093437

(51) Int. Cl.
*H04N 1/387*    (2006.01)
*H04N 1/60*    (2006.01)
*H04N 1/405*    (2006.01)
*H04N 1/409*    (2006.01)

(52) U.S. Cl.
CPC ........... *H04N 1/6008* (2013.01); *H04N 1/405* (2013.01); *H04N 1/409* (2013.01)

(58) Field of Classification Search
CPC .. H04N 1/6008; H04N 1/32128; H04N 1/409; H04N 1/4092; H04N 1/58; H04N 1/60
USPC ....................... 358/1.9, 3.27, 3.28, 3.23, 518
See application file for complete search history.

(56) References Cited

U.S. PATENT DOCUMENTS

| | | |
|---|---|---|
| 5,379,130 A | 1/1995 | Wang et al. |
| 2005/0190408 A1 | 9/2005 | Vittitoe |
| 2005/0265624 A1 | 12/2005 | Washio |
| 2006/0098901 A1* | 5/2006 | Hino .................. H04N 1/32133 382/306 |
| 2007/0154085 A1 | 7/2007 | Jin et al. |

(Continued)

FOREIGN PATENT DOCUMENTS

| | | |
|---|---|---|
| CN | 1992766 A | 7/2007 |
| CN | 101247464 A | 8/2008 |

(Continued)

*Primary Examiner* — Jamares Q Washington
(74) *Attorney, Agent, or Firm* — Jefferson IP Law, LLP

(57) ABSTRACT

An image forming apparatus is provided. The image forming apparatus includes a communicator to receive print data, an image forming unit to print the received print data, and a processor to, in response to the received print data being a scan file, control the image forming unit to perform image processing with respect to the scan file and print the image-processed scan file.

17 Claims, 3 Drawing Sheets

(56) References Cited

U.S. PATENT DOCUMENTS

| | | | |
|---|---|---|---|
| 2007/0253631 A1* | 11/2007 | McCandlish | H04N 1/40075 |
| | | | 382/254 |
| 2012/0236329 A1* | 9/2012 | Kobayashi | G06K 15/1809 |
| | | | 358/1.6 |
| 2013/0185297 A1* | 7/2013 | Apparao | G06F 16/27 |
| | | | 707/736 |
| 2015/0049361 A1 | 2/2015 | Hirose | |
| 2016/0191750 A1 | 6/2016 | Chung et al. | |

FOREIGN PATENT DOCUMENTS

| | | |
|---|---|---|
| CN | 102752471 A | 10/2012 |
| CN | 104732495 A | 6/2015 |
| WO | WO-2015186916 A1 | 12/2015 |

\* cited by examiner

[Fig. 1]
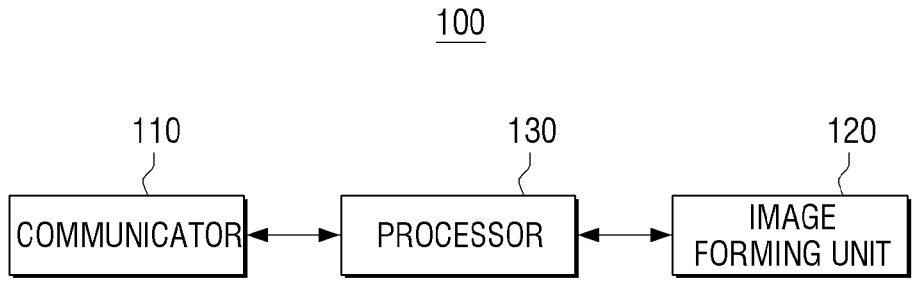
[Fig. 2]
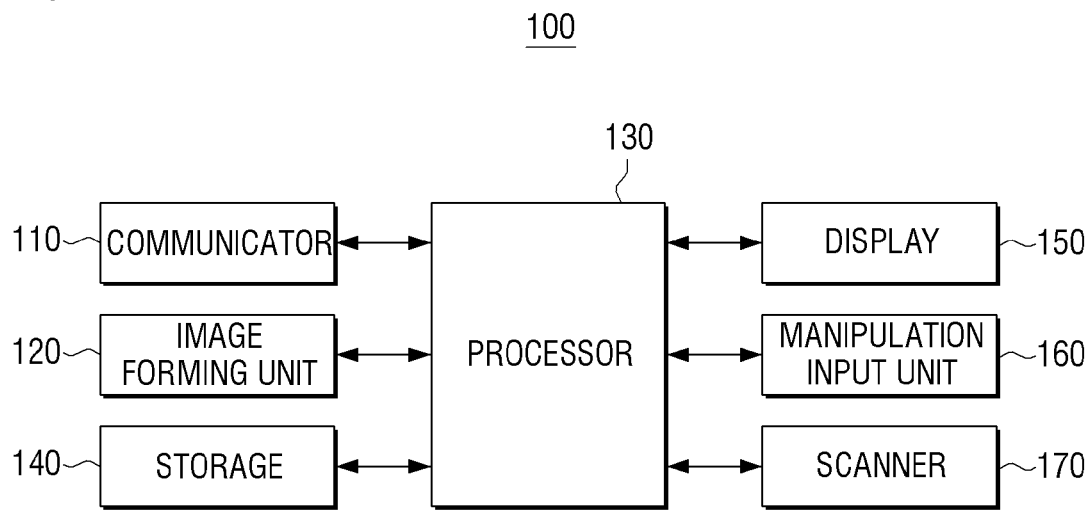
[Fig. 3]
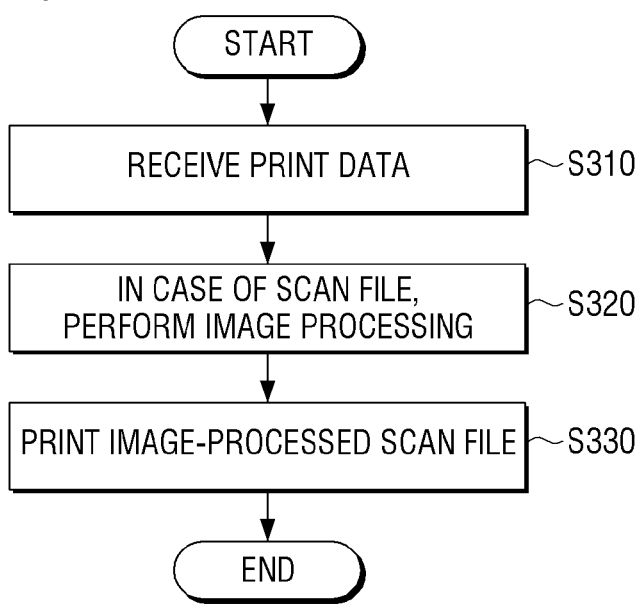

[Fig. 4]
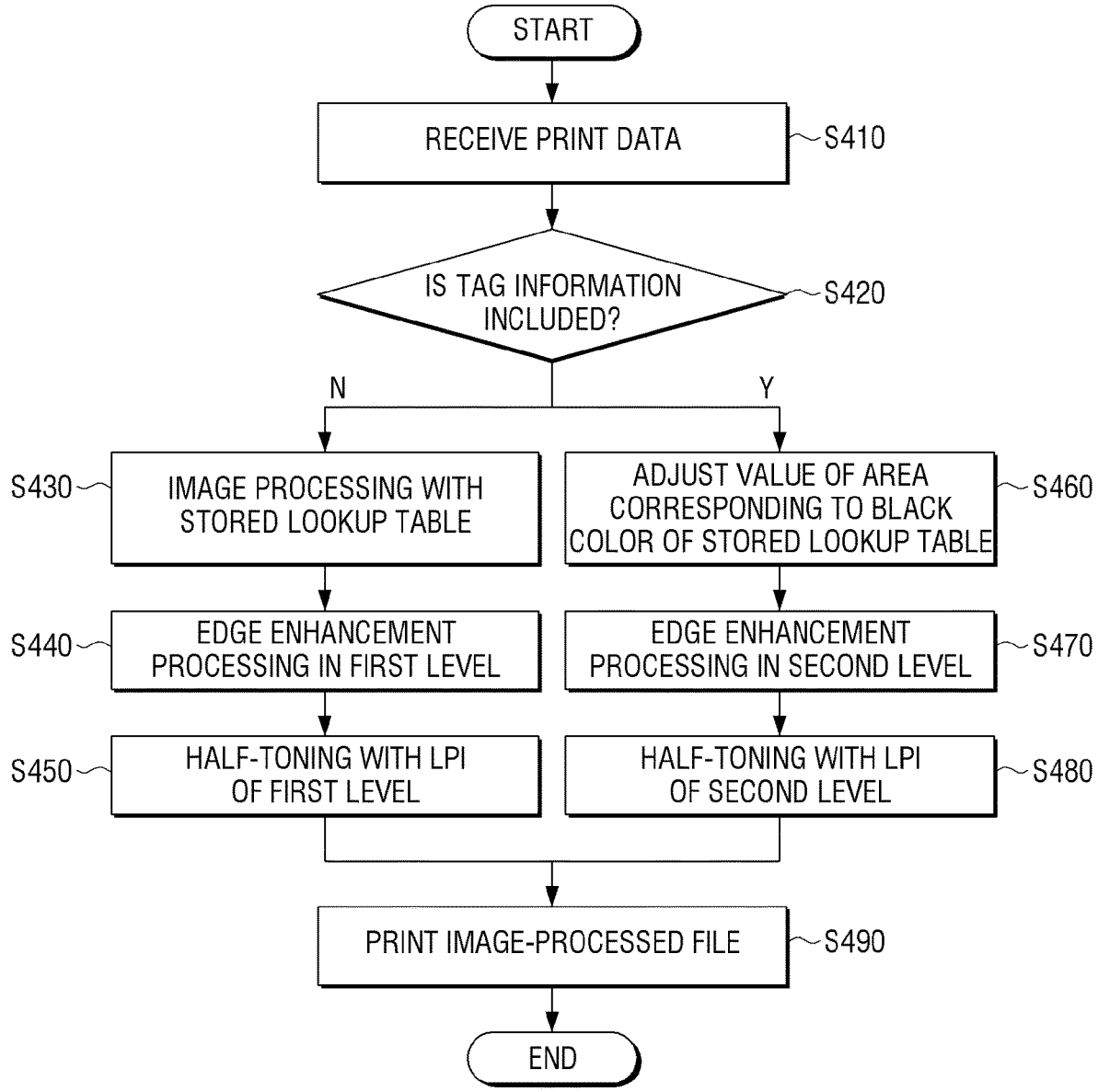

[Fig. 5]
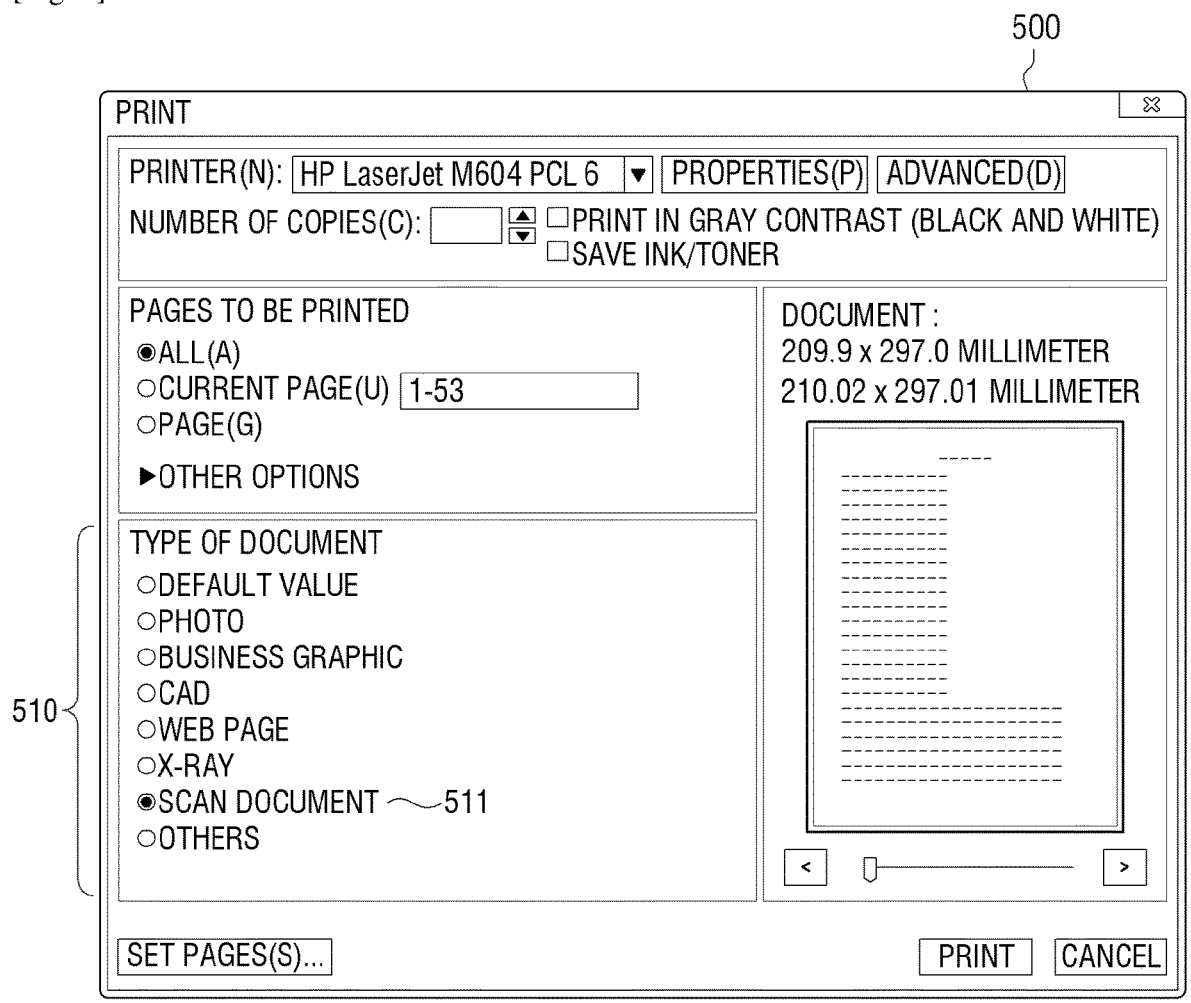

CHARACTERISTICS BASED OPERATION OF IMAGE FORMING APPARATUS

BACKGROUND ART

Devices and methods consistent with what is disclosed herein relate to an image forming apparatus, a controlling method thereof, and a computer readable recording medium. More particularly, devices and methods consistent with what is disclosed herein relate to an image forming apparatus capable of performing image processing by reflecting the characteristics of a scanner in case of a scanned file and printing the same, a controlling method thereof, and a computer readable recording medium.

In general, an image forming apparatus refers to an apparatus for printing print data generated in a print control terminal such as a computer on a recording paper. Examples of such an image forming apparatus include a copier, a printer, a facsimile, a multifunction peripheral (MFP) that combines the functions of the above in a single device, etc.

In general, when scanning is performed using a scanner, the scanned image can be stored in a storage space such as a hard disk drive (HDD), a universal serial bus (USB) memory, and a server in the form of a file such as a joint photographic experts group (JPG), a tagged image file format (TIFF), an xml paper specification (XPS), or a portable document format (PDF) file.

BRIEF DESCRIPTION OF DRAWINGS

Aspects of the present inventive concept will be more apparent by describing examples with reference to the accompanying drawings, in which:

FIG. 1 is a block diagram illustrating a configuration of an image forming apparatus according to an example;

FIG. 2 is a block diagram illustrating a more specific configuration of the image forming apparatus of FIG. 1 according to an example;

FIG. 3 is a flowchart illustrating a controlling method of an image forming apparatus according to an example;

FIG. 4 is a flowchart illustrating an image processing method according to an example; and FIG. 5 is a user interface (UI) screen for receiving an image processing command according to an example.

Throughout the drawings, like reference numerals will be understood to refer to like parts, components, and structures.

MODE FOR THE INVENTION

Various examples will now be described with reference to the accompanying drawings. In the following description, specific examples are provided with accompanying drawings and descriptions thereof. However, the present disclosure may be variously modified and thus embodied in many different ways. It should also be understood that the terminology used herein is for the purpose of description and should not be regarded as limiting in any way to the features, numbers, and embodiments described in the specification, and should be understood to include all changes, equivalents, and alternatives falling within the spirit and scope of the disclosed invention. In the following description, well-known functions or constructions are not described in detail since they would obscure the specification with unnecessary detail.

In the following description, the term "connected to" or "coupled to" that is used to designate a connection or coupling of one element to another element includes both a case in which an element is "directly connected or coupled to" another element and a case in which an element is connected or coupled to another element via still another element. Further, it should be understood that the term "includes" means that other constituent elements may be further included rather than excluding the other constituent elements unless specially mentioned or described to the contrary.

The terms such as "first," "second," and so on may be used to describe a variety of elements, but the elements should not be limited by these terms. The terms are used simply to distinguish one element from other elements.

The terms used herein are intended to explain examples, and not to limit the scope of the present disclosure. Singular forms are intended to include plural forms unless the context clearly indicates otherwise. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

In the examples disclosed herein, terms such as "module" or "unit" refer to an element that performs at least one function or operation. The "module" or "unit" may be realized as hardware, software, or combinations thereof. In addition, a plurality of "modules" or a plurality of "units" may be integrated into at least one module and may be realized as at least one processor (not shown) except for "modules" or "units" that should be realized in a specific hardware.

The term "image forming job" as used herein may mean various jobs related to an image (e.g., copy, print, scan, or fax) such as image formation or creation/storage/transmission of an image, and the term "job" refers not only to an image forming operation but also to a series of processes necessary for performing an image forming operation.

The image forming apparatus may include any device that can perform an image forming job, such as a copier, a printer, a scanner, a fax machine, a multifunction peripheral (MFP), a display device, etc.

Further, the term "hard copy" may mean an operation to output an image onto a printing medium, such as a paper, and the term "soft copy" may mean an operation to output an image to a display device, such as a TV, a monitor, etc.

Further, the term "content" may mean any kind of data that is an object of an image forming job, such as a photo, an image, a document file, etc.

Further, the term "print data" may mean data that is converted into a printable format in a printer.

In addition, the term "scan file" may mean a file which is generated by scanning an image in a scanner.

Further, the term "user" may mean a person who performs an operation that is related to an image forming job using an image forming apparatus or a device that is connected to the image forming apparatus by wire or wirelessly. Further, the term "manager" may mean a person who has the right to access all functions of the image forming apparatus and the system. The manager and the user may be the same person.

FIG. 1 is a block diagram illustrating a configuration of an image forming apparatus according to an example.

Referring to FIG. 1, an image forming apparatus 100 includes a communicator 110, an image forming unit 120, and a processor 130.

The communicator 110 may receive print data. For example, the communicator 110 may connect the image forming apparatus 100 to an external apparatus through any one or more of various connections such as a Local Area Network (LAN), an Internet network, or a mobile communication network (e.g., GSM, UMTS, LTE, WiBRO, etc.). The communicator 110 may also connect to a server which is an apparatus external to the image forming apparatus 100.

In an example, the communicator 110 may include a connection port to connect the image forming apparatus 100 to an external apparatus via a cable. In this case, the communicator 110 may include a universal serial bus (USB) port to which a USB memory, which is an external device storing print data, can be connected. The communicator 110 may also or alternatively include a port to connect to a laptop, a desktop, etc. which are external apparatuses providing print data.

The image forming unit 120 prints the print data which is received through the communicator 110. For example, the processor 130 prints the print data, which is generated by performing image processing with respect to the image data received through the communicator 110. The image forming unit 120 may directly output the image-processed print data to a printing paper of the image forming apparatus 100. Also, the image forming unit 120 may output a print image corresponding to the image-processed print data on a user interface (UI) screen provided on one area of the image forming apparatus 100.

The processor 130 may perform image processing with respect to the print data received through the communicator 110. In addition, the processor 130 may control the image forming unit 120 to print the image-processed print data.

In an example, the processor 130 may determine whether the received print data is a scan file. For example, if the received print data is a scan file including tag information, the processor 130 may determine that the received print data is a scan file. In this case, the tag information may include at least one of model information and manufacturer information of a scanner which has generated the scan file. On the other hand, if the received print data does not include tag information, the processor 130 may determine that the received print data is general print data, not a scan file.

If the received print data is a scan file, the processor 130 may perform image processing corresponding to the tag information with respect to the received print data. For example, if it is determined that the received print data is general print data, the processor 130 may perform image processing according to a first method, and if the received print data is a scan file, the processor 130 may perform image processing according to a second method. In this case, the first method and the second method may be implemented in a way that each pipeline is set on a chip provided in the image forming apparatus 100. Examples of the image processing which is performed according to whether the print data is a scan file or not will be described with reference to FIGS. 3 and 4.

FIG. 2 is a block diagram illustrating a more specific configuration of the image forming apparatus of FIG. 1 according to an example.

Referring to FIG. 2, the image forming apparatus 100 may include the communicator 110, the image forming unit 120, the processor 130, a storage 140, a display 150, a manipulation input unit 160, and a scanner 170.

The communicator 110 and the image forming unit 120 included in the image forming apparatus 100 according to an example may be the same as those illustrated in FIG. 1 and thus, further description will be omitted.

The storage 140 may store print data and may store information which is used to perform image processing with respect to print data. For example, the storage 140 may store various parameters used for image processing print data, a lookup table for converting red, green, blue (RGB) color to cyan, magenta, yellow, black (CMYK) color, etc.

In addition, various kinds of programs such as applications and data such as files may be installed and stored in the storage 140. The processor 130 may access and use data stored in the storage 140, or may store new data in the storage 140. Further, the processor 130 may execute programs installed in the storage 140. In addition, the processor 130 may install an application, such as a third-party application received from outside through the communicator 110, in the storage 140.

The storage 140 may be implemented by a storage medium in the image forming apparatus 100 or by an external storage medium, for example, a removable disk including a USB memory or a web server through a network.

If it is determined that the received print data is general print data, the processor 130 may perform image processing with respect to the received print data using a lookup table stored in the storage 140. For example, the image processing may refer to the operation of converting RGB color to CMYK color.

If it is determined that the received print data is a scan file, the processor 130 may adjust a value of an area corresponding to a black color of the lookup table stored in the storage 140 using the tag information included in the print data. For example, the processor 130 may adjust a value of an area corresponding to a black color of the lookup table so that the CMYK color value of the black color can represent the color gamut of the RGB color space as close as possible.

Accordingly, when printing a scan file, color errors may be reduced in gray color portions and text portions.

If it is determined that the received print data is general print data, the processor 130 may perform edge enhancement processing in a first level. On the other hand, if it is determined that the received print data is a scan file, the processor 130 may perform edge enhancement processing in a second level, which is higher than the first level. Here, the edge enhancement processing means emphasizing images and text portions. If the print data is a scan file, the processor 130 may change a parameter related to edge enhancement processing and perform a higher level of edge enhancement processing by using the changed parameter. As an example, if the received print data is a scan file, the processor 130 may detect an edge area in the print data and change the parameter so as to narrow the detected edge area, or may change the parameter so as to increase the luminance value of the edge area in order to perform a higher level of edge enhancement processing.

A document may generally consist of graphics, texts, images, etc. However, since a scanned file is generated only as an image, if only the conventional image processing is performed, blurring may occur in the boundary area of the scanned file and the surrounding area of the texts. However, according to an example, if the received print data is a scan file, an improved output result can be expected as a higher level of edge enhancement processing is performed for printing.

If it is determined that the received print data is general print data, the processor 130 may perform half-toning in a first level. On the other hand, if it is determined that the received print data is a scan file, the processor 130 may perform edge enhancement processing in a second level, which is higher than the first level. In the following discussion, LPI denotes the number of lines printed per inch, which may indicate the resolution of the printed matter.

For example, if the received data is a scan file, the processor 130 may perform half-toning by composing LPI at a level higher than the LPI level of the general print data in the half-toning processing of CMYK color. Here, the LPI of the second level may be greater than 190 LPI.

According to the above-described example, it is possible to expect an effect of improving defects such as a mosaic pattern occurring in the gradation area in the scanned file.

When a scanned file is printed, the processor 130 may adjust the Print 1D-gamma table to improve error and noise due to the deviation of the background color caused by a difference in color reproduction power for each input/output device.

The display 150 may be disposed on one side of the image forming apparatus 100 and may display a UI screen for providing print information to users. For example, if a print command of print data is input, the display 150 may display a UI screen for inputting whether the print data is a scan file or not under the control of the processor 130. In this case, if tag information is not included in the received print data, the processor 130 may control the display 150 to display a UI screen for receiving a user's selection regarding whether to perform printing by performing image processing which reflects the characteristics of the scan file.

The manipulation input unit 160 may be disposed on one side of the image forming apparatus 100 and receive a user's manipulation command. For example, the manipulation input unit 160 may receive an input from a user regarding whether to perform image processing with respect to the print data by reflecting the characteristics of the scan file. Here, the manipulation input unit 160 may be at least one physical button disposed on one side of the image forming apparatus 100 or a touch screen. If the manipulation input unit 160 is a touch screen, the manipulation input unit 160 may be integrated with the display 150.

In an example, if a user inputs that the print data is a scan file through the manipulation input unit 160, the processor 130 may perform printing by performing image processing with respect to the print data by reflecting the characteristics of the scan file.

Accordingly, even if tag information is not included in the scan file, printed matter having improved quality can be obtained by inputting the user's manipulation command.

The scanner 170 may generate a scan image by scanning a manuscript. In this case, the processor 130 may generate a scan file by adding the apparatus information of the image forming apparatus 100 in the generated scan image as tag information. In other words, the processor 130 assigns a tag space in the scan file and stores the information, thereby identifying that the image file is a file generated by scanning in a subsequent output process.

As described above, as the scan file may be generated by adding tag information, when printing the scan file, the image forming apparatus may recognize that it is a scan file and perform image processing by reflecting the characteristics of the scan file to obtain improved printed matter.

FIG. 3 is a flowchart illustrating a controlling method of an image forming apparatus according to an example.

Referring to FIG. 3, the image forming apparatus may receive print data in operation S310. For example, when a print command is input, the image forming apparatus may receive print data from a connected external apparatus. Here, the external apparatus may be an electronic apparatus such as a personal computer (PC), a tablet, a server, etc. connected to the image forming apparatus via a cable or wirelessly, or a storage medium such as a USB memory, a hard disk, etc. connected through a port provided in the image forming apparatus.

If the received print data is a scan file, the image forming apparatus may perform image processing in operation S320. For example, the image forming apparatus may determine whether the received print data is a scan file, and if the received print data is a scan file, may perform image processing by reflecting the characteristics of the scan file. Here, if tag information is included in the received print data, the image forming apparatus may determine that it is a scan file. Further, even if tag information is not included in the received print data, when a user inputs that the received print data is a scan file, the image forming apparatus may determine that the received print data is a scan file.

If the received print data is not a scan file, the image forming apparatus may perform image processing according to a first method. On the other hand, if the received print data is a scan file, the image forming apparatus may perform image processing according to a second method. For example, the image forming apparatus may compose each of the pipelines for performing the image processing according to the first method and performing the image processing according to the second method, so that the image processing is performed through the predetermined pipeline according to whether or not the print data is a scan file. An example of performing image processing will be described with reference to FIG. 4.

The image forming apparatus may print the image-processed scan file in operation S330.

As described above, the image processing is performed differently according to whether or not the print data is a scan file and thus, output matter with improved quality can be obtained even if the print data is a scan file.

FIG. 4 is a flowchart illustrating an image processing method according to an example.

Referring to FIG. 4, an image forming apparatus may receive print data in operation S410. For example, when a print command is input, the image forming apparatus may receive print data from a connected external apparatus. Here, the external apparatus may be an electronic apparatus such as a PC, a tablet, a server, etc. connected to the image forming apparatus via a cable or wirelessly, or a storage medium such as a USB memory, a hard disk, etc. connected through a port provided in the image forming apparatus.

The image forming apparatus may determine whether tag information is included in the received print data in operation S420.

If it is determined in operation S420-N that tag information is not included in the received print data, the image forming apparatus may determine that the received print data is not a scan file and perform image processing with respect to the received print data according to a first method.

For example, if the received print data is not a scan file, the image forming apparatus may perform image processing using a stored lookup table in operation S430. As an example, the lookup table may be to convert RGB color to CMYK color for printing.

The image forming apparatus may perform edge enhancement processing in a first level in operation S440, and perform half-toning with LPI of a first level in operation S450. In this case, the first level is determined by a pre-stored parameter and may mean the degree of image processing which is performed with respect to print data when performing general printing.

If it is determined in operation S420-Y that tag information is included in the received print data, the image forming apparatus may determine that the received print data is a scan file and perform image processing with respect to the received print data according to a second method. Furthermore, even if tag information is not included in the received print data, when a user inputs that the print data is a scan file through a UI screen while inputting a print command, the image forming apparatus may perform image processing with respect to the print data according to the second method. An example of a UI screen for receiving an input from the user that the print data is a scan file will be described with reference to FIG. 5.

If the received print data is a scan file, the image forming apparatus may adjust a value of an area corresponding to a black color of the stored lookup table in operation S460. For example, the processor 130 may adjust a value of an area corresponding to a black color of the lookup table so that the CMYK color value of the black color can represent the color gamut of the RGB color space as close as possible. Accordingly, when printing a scan file, color errors may be reduced in gray color portions and text portions.

The image forming apparatus may perform edge enhancement processing in a second level in operation S470, and perform half-toning with LPI of a second level in operation S480. In this case, the second level is strengthened as compared with the first level, which means an improved image processing degree compared with normal printing when printing a scan file by changing the pre-stored parameter. Accordingly, when a scan file is printed, it is possible to reduce an edge blur phenomenon occurring in the printed matter and a mosaic-type defect occurring in the gradation area.

Although not illustrated in the drawing, if the received print data is a scan file, the image forming apparatus may adjust the Print 1D-gamma table to improve the error and noise of the background color which occurs when the scanned file is printed.

The image forming apparatus may print the image-processed file in operation S490. For example, the image forming apparatus may print an image corresponding to the image-processed file on a printing paper.

FIG. 5 is a view illustrating a UI screen for receiving an image processing command according to an example.

Referring to FIG. 5, the UI screen 500 is a screen which is provided when a user inputs a print command, and may be displayed on a display provided in an image forming apparatus or on a display provided in an electronic apparatus connected to an image forming apparatus. As an example, the UI screen 500 may be displayed on a display, such as display 150, or on a manipulation input unit, such as manipulation input unit 160.

The UI screen 500 may include an area 510 for selecting the type of document of print data. In this case, if the file that the user wishes to print is a scan file, the user may select the item of scan document 511 in the document type area 510 of the UI screen 500 and input a print command.

Accordingly, the image forming apparatus may determine that the received print data is a scan file and perform printing by performing image processing by reflecting the characteristics of a scan file.

As a result, even if tag information is not included in the scan file, it is possible to obtain an improved output result by performing printing after performing image processing by reflecting the characteristics of a scan file.

Methods according to the present disclosure, such as the above described examples, may be implemented as a program instruction type that may be performed through various computer means and may be recorded in a non-transitory computer readable recording medium. The non-transitory computer readable recording medium may include program commands, data files, and data structures either alone or in combination. For example, the non-transitory computer readable recording medium may be stored in a volatile or non-volatile storage device such as a ROM, a memory such as a RAM, a memory chip, and a device or an integrated circuit, or a storage medium which may be read with a machine (for example, computer) simultaneously with being optically or magnetically recorded like a CD, a DVD, a magnetic disk, a magnetic tape, or the like, regardless of whether it is deleted or again recorded. The memory which may be included in a mobile terminal may be one example of a storage medium which may be read with programs including instructions for implementing the embodiments of the present disclosure or a machine appropriate to store the programs. The program commands recorded in the medium may be especially designed and constituted for the present disclosure or be known to those skilled in a field of computer software.

Although the present disclosure has been described with reference to certain examples and drawings, it is to be understood that the present disclosure is not limited to the examples described above, and it is possible for those skilled in the art to make various modifications and variations from the described examples.

Accordingly, the scope of the present disclosure is not construed as being limited to the described examples, but is defined by the appended claims as well as equivalents thereto.

The invention claimed is:

1. An image forming apparatus comprising:
a communicator to receive print data;
an image forming unit to print the received print data; and
a processor to:
    determine whether the received print data is a scan file,
    in response to the received print data being a scan file, control the image forming unit to perform image processing on the received print data according to a second method,
    in response to the received print data not being a scan file, control the image forming unit to perform image processing on the received print data according to a first method, and
    control the image forming unit to print the image-processed print data,
    wherein the performing of the image processing according to the second method includes adjusting a value of a lookup table used for color conversion, performing an edge enhancement in a second level that is different from a first level of edge enhancement corresponding to the first method, or performing a half-toning at a second level that is different from a first level of half-toning corresponding to the first method.

2. The apparatus as claimed in claim 1, wherein the processor:
    determines whether the received print data is a scan file by determining whether tag information is included in the received print data,
    in response to tag information not being included, performs image processing according to the first method, and
    in response to tag information being included, performs image processing corresponding to the tag information according to the second method.

3. The apparatus as claimed in claim 2, further comprising:
  a storage to store the lookup table for converting red, green, blue (RGB) color to cyan, magenta, yellow, black (CMYK) color,
  wherein the processor adjusts a value of an area corresponding to a black color in the lookup table when performing image processing according to the second method.

4. The apparatus as claimed in claim 2, wherein the processor:
  performs edge enhancement processing in the first level when performing image processing according to the first method, and
  performs edge enhancement processing in the second level, which is higher than the first level, when performing image processing according to the second method.

5. The apparatus as claimed in claim 2, wherein the processor:
  performs half-toning with line per inch (LPI) of the first level when performing image processing according to the first method, and
  performs half-toning with LPI of the second level, which is higher than the first level, when performing image processing according to the second method.

6. The apparatus as claimed in claim 2, further comprising:
  a storage to store the lookup table for converting red, green, blue (RGB) color to cyan, magenta, yellow, black (CMYK) color,
  wherein the processor:
    when performing image processing according to the first method, performs image processing using the stored lookup table, performs edge enhancement processing in the first level, and performs half-toning with line per inch (LPI) of the first level, and
    when performing image processing according to the second method, adjusts a value of an area corresponding to a black color in the lookup table, performs edge enhancement processing in the second level, which is higher than the first level, and performs half-toning with LPI of the second level, which is higher than the first level.

7. The apparatus as claimed in claim 1, further comprising:
  a display to display a user interface (UI) screen for inputting whether the received print data is a scan file; and
  a manipulation input unit to receive a user's manipulation command,
  wherein the processor, in response to the user inputting that the received print data is a scan file through the UI screen displayed on the display, controls the image forming unit to perform the image processing on the received print data according to the second method and print the image-processed print data.

8. A controlling method of an image forming apparatus, the method comprising:
  receiving print data;
  determining whether the received print data is a scan file;
  in response to the received print data being a scan file, performing image processing on the received print data according to a second method;
  in response to the received print data not being a scan file, performing image processing on the received print data according to a first method; and
  printing the image-processed print data,
  wherein the performing of the image processing according to the second method includes adjusting a value of a lookup table used for color conversion, performing an edge enhancement in a second level that is different from a first level of edge enhancement corresponding to the first method, or performing a half-toning at a second level that is different from a first level of half-toning corresponding to the first method.

9. The method as claimed in claim 8, wherein the performing of the image processing comprises:
  determining whether the received print data is a scan file by determining whether tag information is included in the received print data;
  in response to tag information not being included, performing image processing according to the first method; and
  in response to tag information being included, performing image processing corresponding to the tag information according to the second method.

10. The method as claimed in claim 9, further comprising:
  storing the lookup table for converting red, green, blue (RGB) color to cyan, magenta, yellow, black (CMYK) color,
  wherein the performing of the image processing comprises adjusting a value of an area corresponding to a black color in the lookup table when performing image processing according to the second method.

11. The method as claimed in claim 9, wherein the performing of the image processing comprises:
  performing edge enhancement processing in the first level when performing image processing according to the first method; and
  performing edge enhancement processing in the second level, which is higher than the first level, when performing image processing according to the second method.

12. The method as claimed in claim 9, wherein the performing of the image processing comprises:
  performing half-toning with line per inch (LPI) of the first level when performing image processing according to the first method; and
  performing half-toning with LPI of the second level, which is higher than the first level, when performing image processing according to the second method.

13. The method as claimed in claim 9, further comprising:
  storing the lookup table for converting red, green, blue (RGB) color to cyan, magenta, yellow, black (CMYK) color,
  wherein the performing of the image processing comprises:
  when performing image processing according to the first method, performing image processing using the stored lookup table, performing edge enhancement processing in the first level, and performing half-toning with line per inch (LPI) of the first level, and
  when performing image processing according to the second method, adjusting a value of an area corresponding to a black color in the lookup table, performing edge enhancement processing in the second level, which is higher than the first level, and performing half-toning with LPI of the second level, which is higher than the first level.

14. The method as claimed in claim 8, further comprising:
  displaying a user interface (UI) screen for receiving an input regarding whether the received print data is a scan file;

receiving an input regarding whether the received print data is a scan file from the user through the displayed UI screen;

in response to the received print data being a scan file, performing the image processing on the received print data according to the second method; and printing the image-processed print data.

15. A non-transitory computer readable recording medium storing code representing instructions that, when executed at a processor, cause the processor to:

receive print data;

determine whether the received print data is a scan file;

in response to the received print data being a scan file, perform image processing on the received print data according to a second method;

in response to the received print data not being a scan file, perform image processing on the received print data according to a first method; and print the image-processed print data, wherein the performing of the image processing according to the second method includes adjusting a value of a lookup table used for color conversion, performing an edge enhancement in a second level that is different from a first level of edge enhancement corresponding to the first method, or performing a half-toning at a second level that is different from a first level of half-toning corresponding to the first method.

16. The apparatus as claimed in claim 2, wherein the tag information includes model information or manufacturer information of a scanner that generated the scan file.

17. The method as claimed in claim 9, wherein the tag information includes model information or manufacturer information of a scanner that generated the scan file.

* * * * *